(12) United States Patent
Akahane et al.

(10) Patent No.: US 7,923,050 B2
(45) Date of Patent: Apr. 12, 2011

(54) OIL COMPOSITION FOR COATING

(75) Inventors: Akira Akahane, Yokosuka (JP);
Yoshiyuki Hatano, Yokosuka (JP);
Hirofumi Haruna, Yokosuka (JP);
Kiyomi Oonishi, Yokosuka (JP); Yuka Kikuchi, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 0 days.

(21) Appl. No.: 12/922,427

(22) PCT Filed: Mar. 4, 2009

(86) PCT No.: PCT/JP2009/054067
§ 371 (c)(1),
(2), (4) Date: Sep. 13, 2010

(87) PCT Pub. No.: WO2009/116396
PCT Pub. Date: Sep. 24, 2009

(65) Prior Publication Data
US 2011/0008499 A1    Jan. 13, 2011

(30) Foreign Application Priority Data
Mar. 17, 2008    (JP) .............................. 2008-067777

(51) Int. Cl.
*A23D 9/00*    (2006.01)
(52) U.S. Cl. ..................... 426/607; 426/601; 426/98
(58) Field of Classification Search ................. 426/601, 426/607, 98, 99, 302
See application file for complete search history.

(56) References Cited

U.S. PATENT DOCUMENTS

| | | | | |
|---|---|---|---|---|
| 4,832,975 A | * | 5/1989 | Yang | 426/607 |
| 5,366,752 A | | 11/1994 | Cain et al. | |
| 5,431,948 A | * | 7/1995 | Cain et al. | 426/607 |
| 5,587,195 A | * | 12/1996 | Sassen | 426/607 |
| 6,033,695 A | * | 3/2000 | Cain et al. | 426/89 |
| 6,777,018 B2 | * | 8/2004 | Floeter et al. | 426/603 |
| 7,108,888 B2 | * | 9/2006 | Floeter | 426/603 |
| 7,611,744 B2 | * | 11/2009 | Cain et al. | 426/606 |
| 7,618,670 B2 | * | 11/2009 | Ullanoormadam | 426/607 |
| 7,700,146 B2 | * | 4/2010 | Cleenewerck | 426/607 |
| 7,794,773 B2 | * | 9/2010 | Cain et al. | 426/606 |
| 2010/0215810 A1 | * | 8/2010 | Zand et al. | 426/94 |

FOREIGN PATENT DOCUMENTS

| | | |
|---|---|---|
| JP | 06-133693 A | 5/1994 |
| JP | 10-165100 A | 6/1998 |
| JP | 2002-306076 A | 10/2002 |
| JP | 2005-336471 A | 12/2005 |
| JP | 2009-017821 A | 1/2009 |

* cited by examiner

*Primary Examiner* — Carolyn A Paden
(74) *Attorney, Agent, or Firm* — Holtz, Holtz, Goodman & Chick, P.C.

(57) ABSTRACT

An oil-and-fat composition for coating that simultaneously exhibit both significantly conflicting properties: drying quickly at ambient temperature and hardly peeling off (when eaten), and a food product including the oil-and-fat composition. The oil-and-fat composition for coating of the present invention includes an interesterified oil (A) that is nonselectively interesterified and contains 80 mass % or more of a fatty acid having 16 or more carbon atoms and 35 to 60 mass % of a saturated fatty acid having 16 or more carbon atoms in its constituent fatty acids, and an interesterified oil (B) that is nonselectively interesterified and contains 20 to 60 mass % of a saturated fatty acid having 12 to 14 carbon atoms and 40 to 80 mass % of a saturated fatty acid having 16 to 18 carbon atoms in its constituent fatty acids. The composition also includes a tri-saturated fatty acid acylglycerol in a content of 10 to 15 mass %.

20 Claims, No Drawings

OIL COMPOSITION FOR COATING

This application is the United States national phase application of International Application PCT/JP2009/054067 filed Mar. 4, 2009.

TECHNICAL FIELD

The present invention relates to an oil-and-fat composition for coating and a food product having the same. Specifically, the invention relates to an oil-and-fat composition for coating that dries quickly and is hardly peeled off when it is applied to food.

BACKGROUND ART

Food products where biscuits, bread, and frozen dessert such as ice cream are coated with oil-and-fat compositions such as chocolate have been marketed. Such chocolate for coating (chocolate coat) is required to have properties that the chocolate dries quickly after coating, that cracking hardly occurs when it is cut with a knife or the like, that a glossy surface is obtained, and that melt-in-the-mouth when eaten is satisfactory.

Among such properties, particularly required are properties of "drying quickly at ambient temperature" for shortening the manufacturing time at ambient temperature and preventing chocolate from adhering to a food-wrapping film and of "being hardly peeled off" for preventing the chocolate from being peeled off in flakes when it is cut with a knife or the like or it is eaten. However, there has not been one satisfying both properties at the same time.

If usual chocolate is used as coating for food, the chocolate is readily peeled off, In particular, when the food is soft bread or sweets such as doughnuts and sponge cakes, the peeling phenomenon of the coated chocolate is very often caused by stress application, resulting in a problem that the value of an end product is reduced.

In order to solve such problems, it has been conventionally tried to blend a liquid oil to usual chocolate for preventing the chocolate from peeling off. By blending the liquid oil, the above-mentioned disadvantages are improved to some extent. However, the blending of the liquid oil reduces the melting point of the chocolate and thereby to elongate the drying time. In addition, it causes a problem that the liquid oil oozes to the surface of the chocolate, that is, a so-called sweating phenomenon occurs.

In order to solve these problems, Patent Literature 1 discloses a process of producing coating chocolate where combination of an oil-and-fat containing di-saturated mono-unsaturated glyceride and a laurine-based oil-and-fat is used.

Citation List
Patent Literature
PTL 1: Japanese Unexamined Patent Application Publication No. H6-133693

SUMMARY OF INVENTION

Technical Problem

However, both of drying quickly at ambient temperature and hardly peeling off (when eaten) are not simultaneously satisfied. Both physical properties are those that significantly conflict with each other, and it has been confirmed that simultaneous achievement of both properties is very difficult.

In the light of the above problems, it is an object of the present invention to provide an oil-and-fat composition for coating having both significantly conflicting properties: drying quickly at ambient temperature and hardly peeling off (when eaten), and to provide a food product having the oil-and-fat composition.

Furthermore, since it is food, it is preferable that the composition be good in melt-in-the-mouth and flavor when eaten, in addition to satisfy the above-mentioned properties. Therefore, it is an object of the present invention to provide an oil-and-fat composition for coating having the above-mentioned properties and further being good in melt-in-the-mouth and flavor and to provide a food product having the oil-and-fat composition. In addition, it is an object of the present invention to provide an oil-and-fat composition for coating that is not so sticky when it is used as chocolate.

Solution To Problem

In order to achieve the objects, the present inventors have conducted intensive studies and have found that an oil-and-fat composition including a specific interesterified oil and having a tri-saturated fatty acid acylglycerol content in a specific range can achieve the above-mentioned objects. Thus, the present invention has been accomplished.

That is, the present invention provides an oil-and-fat composition for coating where the composition includes interesterified oil (A) that is nonselectively interesterified and contains 80 mass % or more of a fatty acid having 16 or more carbon atoms and 35 to 60 mass % of a saturated fatty acid having 16 or more carbon atoms in its constituent fatty acids, and interesterified oil (B) that is nonselectively interesterified and contains 20 to 60 mass % of a saturated fatty acid having 12 to 14 carbon atoms and 40 to 80 mass % of a saturated fatty acid having 16 to 18 carbon atoms in its constituent fatty acids, and the composition includes a tri-saturated fatty acid acylglycerol in a content of 10 to 15 mass %.

In the interesterified oil (A), the total content of the oleic acid and the linoleic acid in the constituent fatty acids is preferably 40 mass % or more relative to the total mass of the constituent fatty acids of the interesterified oil.

The raw oil-and-fat material of the interesterified oil (B) preferably contains a laurine-based oil-and-fat or its hydrogenated oil (b1) and a palm-based oil-and-fat or its hydrogenated oil (b2).

The interesterified oil (B) preferably has an iodine value of 20 or less.

The oil-and-fat composition for coating of the present invention may further contain an oil-and-fat having a tri-saturated fatty acid acylglycerol content of 90 mass % or more.

The oil-and-fat composition for coating of the present invention may further contain a liquid oil.

It is preferable that the content of the interesterified oil (A) is larger than any other ingredients in the oil-and-fat composition.

The content of the interesterified oil (B) is preferably 20 mass % or less in the total oil-and-fat composition.

The total content of the interesterified oil (A) and the interesterified oil (B) is preferably 80 mass % or more in the total oil-and-fat composition.

The total content of the interesterified oil (A), the interesterified oil (B), and the liquid oil is preferably 80 mass % or more in total oil-and-fat composition.

Furthermore, the present invention provides oily food for coating containing the oil-and-fat composition for coating.

Furthermore, the present invention provides a food product coated with the oily food for coating.

Advantageous Effects of Invention

According to the present invention, an oil-and-fat composition for coating having conflicting properties, drying quickly at ambient temperature and hardly peeling off when eaten, can be obtained. Furthermore, according to the present invention, chocolate containing the oil-and-fat composition for coating is obtained, and also an oil-and-fat composition for coating that is good in melt-in-the-mouth and flavor and chocolate containing the oil-and-fat composition for coating can be obtained. Furthermore, the oil-and-fat composition for coating of the present invention is not so sticky, and, therefore, chocolate being not so sticky by containing the oil-and-fat composition for coating can be obtained.

DESCRIPTION OF EMBODIMENTS

First, the oil-and-fat composition for coating of the present invention will be described below.

The oil-and-fat composition for coating of the present invention includes:

interesterified oil (A) that is nonselectively interesterified and contains 80 mass % or more of a fatty acid having 16 or more carbon atoms and 35 to 60 mass % of a saturated fatty acid having 16 or more carbon atoms in its constituent fatty acids, and interesterified oil (B) that is nonselectively interesterified and contains 20 to 60 mass % of a saturated fatty acid having 12 to 14 carbon atoms and 40 to 80 mass % of a saturated fatty acid having 16 to 18 carbon atoms in its constituent fatty acids.

First, the interesterified oil (A) will be described. The interesterified oil (A) is nonselectively interesterified oil containing 80 mass % or more of a fatty acid having 16 or more carbon atoms and 35 to 60 mass % of a saturated fatty acid having 16 or more carbon atoms in its constituent fatty acids.

The interesterified oil (A) contains the fatty acid having 16 or more carbon atoms in an amount of 80 mass % or more, preferably 90 mass % or more, further preferably 95 mass % or more, and most preferably 98 mass % or more in its constituent fatty acids. Furthermore, all the constituent fatty acids of the interesterified oil (A) may be the fatty acid having 16 or more carbon atoms. That is, the content of the fatty acid having 16 or more carbon atoms may be 100 mass %.

In addition, the interesterified oil (A) contains saturated fatty acid having 16 or more carbon atoms in an amount of 35 to 60 mass %, preferably 40 to 50 mass %, in its constituent fatty acids. Within the above-mentioned ranges, the effects of the present invention are more suitably exhibited.

In addition, in the interesterified oil (A), the total content of the oleic acid (C18:1) and the linoleic acid (C18:2) in its constituent fatty acids is preferably 40 mass % or more relative to the total mass of the constituent fatty acids of the interesterified oil. Within this range, the effects of the present invention are more suitably exhibited.

Incidentally, since the interesterified oil (A) is an oil-and-fat obtained by interesterifying a raw oil-and-fat material, the composition of the constituent fatty acids does not change before and after the interesterification. Therefore, the constituent fatty acids of the raw oil-and-fat material for producing the interesterified oil (A) is the same as that of the interesterified oil (A) and therefore includes a fatty acid having 16 or more carbon atoms in a content of 80 mass % or more and a saturated fatty acid having 16 or more carbon atoms in a content of 35 to 60 mass %.

The present invention is characterized by the use of the interesterified oil (A), and vegetable oils-and-fats that are not interesterified or their mixtures are not contained. The process of the interesterification will be described below. Incidentally, the term "interesterification" herein means nonselective interesterification. The term "nonselective interesterification" means that the distribution of the constituent fatty acids of the resulting interesterified oil is uniform.

The content of the interesterified oil (A) in the oil-and-fat composition for coating of the present invention is not particularly limited, but is preferably larger than any other ingredients in the oil-and-fat composition for coating. The content is preferably 50 mass % or more, further preferably 60 to 99 mass % or 60 to 95 mass %. When the content of the interesterified oil (A) is in the range above, the effects of the present invention are more suitably exhibited.

The raw oil-and-fat material of the interesterified oil (A) is not particularly limited as long as the constituent fatty acids content is within the above-mentioned range. Specifically, a usual vegetable oil-and-fat (including fractionated oil) or its mixture can be used.

Further specific examples include fractionated palm oils themselves and oils-and-fats containing the fractionated palm oils. Further specific examples include a palm oil soft fraction (hereinafter, also referred to as interesterified oil (A-1)), an oil mixture of a palm oil hard fraction and a liquid oil (hereinafter, also referred to as interesterified oil (A-2)), and an oil mixture of a cottonseed oil hard fraction and a highly hydrogenated oil (hereinafter, also referred to as interesterified oil (A-3)).

The palm oil soft fraction used as the raw oil-and-fat material of the interesterified oil (A-1) is a liquid fraction (oleic fraction) obtained by fractionating palm oil. The palm oil soft fraction also includes a liquid fraction (oleic fraction) obtained by fractionating a palm mid fraction fractionated from palm oil. More specific examples include a liquid fraction (palm olein, one-stage fractionated oil) obtained by fractionating palm oil, a liquid fraction (palm super olein, two-stage fractionated oil) obtained by fractionating palm olein, a liquid fraction (two-stage fractionated oil) obtained by fractionating the palm mid fraction, and a liquid fraction (soft palm, two-stage fractionated oil) obtained by fractionating palm stearin.

The palm oil hard fraction contained in the raw oil-and-fat material of the interesterified oil (A-2) is a solid fraction (stearic fraction) obtained by fractionating palm oil. In addition, it contains a solid fraction (stearic fraction) obtained by fractionating a palm mid fraction fractionated from palm oil. More specific examples include a solid fraction (palm stearin, one-stage fractionated oil) obtained by fractionating palm oil, a solid fraction (hard stearin, two-stage fractionated oil) obtained by fractionating palm stearin, a solid fraction (two-stage fractionated oil) obtained by fractionating a palm mid fraction, and a solid fraction (two-stage fractionated oil) obtained by fractionating palm olein.

Incidentally, the process of fractionating palm oil is not particularly limited, and any of solvent fractionation, dry fractionation, and emulsification fractionation may be employed.

In addition, the term "liquid oil" means an oil-and-fat that is transparent at 20° C. in visual investigation. Specific examples thereof include soybean oil, rapeseed oil, corn oil, safflower oil, and sunflower oil.

Furthermore, the mixture ratio of the palm oil hard fraction and the liquid oil in the raw oil-and-fat material of the interesterified oil (A-2) is not particularly limited as long as the constituent fatty acids satisfy the above-mentioned range. The ratio of the constituent fatty acids satisfying the above-mentioned range depends on the combination and therefore cannot be categorically determined.

The highly hydrogenated oil contained in the interesterified oil (A-3) is a solid oil-and-fat hydrogenated to an extent that unsaturated fatty acid is almost absent, that is, the iodine value is substantially zero, usually 2 to 3 or less and has a high hardness and a high melting point. Examples of the highly hydrogenated oil used in the present invention include highly hydrogenated oils obtained from rapeseed oil, soybean oil, corn oil, safflower oil, sunflower oil, olive oil, rice grain oil, cottonseed oil, palm oil, mustard oil, lard, and beef tallow as raw materials.

Furthermore, the mixture ratio of the hard fraction of cottonseed oil (cottonseed oil stearin) and the highly hydrogenated oil in the raw oil-and-fat material of the interesterified oil (A-3) is not particularly limited as long as the constituent fatty acids satisfy the above-mentioned range. The ratio of the constituent fatty acids satisfying the above-mentioned range depends on the combination and therefore cannot be categorically determined.

The raw oil-and-fat material of the interesterified oil (A) may contain another oil-and-fat and fatty acid, in addition to the above-mentioned oil-and-fat and the fatty acid, as long as the constituent fatty acids are in the above-mentioned range.

Next, the interesterified oil (B) will be described. The interesterified oil (B) is nonselectively interesterified oil containing 20 to 60 mass % of a saturated fatty acid having 12 to 14 carbon atoms and 40 to 80 mass % of a saturated fatty acid having 16 to 18 carbon atoms in its constituent fatty acids.

The interesterified oil (B) contains the saturated fatty acid having 12 to 14 carbon atoms in an amount of 20 to 60 mass %, preferably 28 to 35 mass %, in its constituent fatty acids. In addition, the interesterified oil (B) contains the saturated fatty acid having 16 to 18 carbon atoms in an amount of 40 to 80 mass %, preferably 46 to 70 mass %, and further preferably 52 to 68 mass % in its constituent fatty acids. Within the above-mentioned ranges, the effects of the present invention are more suitably exhibited.

The present invention is characterized by the use of the interesterified oil (B), and vegetable oils-and-fats that are not interesterified or their mixtures are not contained. The process of the interesterification will be described below.

The interesterified oil (B) used in the present invention may be one that is hydrogenated (hydrogenation), as described below. Incidentally, in the present description, a hydrogenated oil-and-fat is called "hydrogenated oil" in some cases. The content of the saturated fatty acid having 12 to 14 carbon atoms and the content of the saturated fatty acid having 16 to 18 carbon atoms in the constituent fatty acids may vary when the hydrogenation is performed. Therefore, the raw oil-and-fat material of the interesterified oil cannot be specified, and any raw oil-and-fat material can be used. Accordingly, one that finally gives an interesterified oil (B) containing a saturated fatty acid having 12 to 14 carbon atoms and a saturated fatty acid having 16 to 18 carbon atoms in the above-mentioned ranges in its constituent fatty acids can be selected and used.

The iodine value of the interesterified oil (B) is not particularly limited, but is preferably 20 or less, further preferably 10 or less, further preferably 5 or less, further preferably 2 or less, and most preferably 1 or less. An iodine value of 20 or less of the interesterified oil (B) can be achieved by, for example, using a raw oil-and-fat material having an iodine value of 20 or less. Examples of the raw oil-and-fat material having an iodine value of 20 or less include fractionated oils (solid fraction), hydrogenated oils, and highly hydrogenated oils. Furthermore, even if an oil-and-fat having an iodine value of 20 or more is used, the iodine value can be reduced to 20 or less by mixing an oil-and-fat having an iodine value of 20 or less, Furthermore, even if an oil-and-fat having an iodine value of 20 or more (or an oil-and-fat mixture containing two or more oils-and-fats) is used, the iodine value can be reduced to 20 or less by performing hydrogenation before or after interesterification. Incidentally, the iodine value can be measured in accordance with the method of "Standard Methods for the Analysis of Fats 2.3.4.1-1996 (Japan Oil Chemists' Society)".

The content of the interesterified oil (B) in the oil-and-fat composition for coating of the present invention is not particularly limited, but is preferably 20% or less, further preferably less than 15%, further preferably 2% or more and less than 15%, and most preferably 2 to 10%. By controlling to the range above, the effects of the present invention are more suitably exhibited. When the content of the interesterified oil (B) is higher than 20%, the melt-in-the-mouth properties may be deteriorated. Those having a content of less than 15% are superior in cracking and melt-in-the-mouth properties to those having a content of 15% or more.

Examples of the interesterified oil (B) include oils-and-fats where an oil mixture of two or more raw oil-and-fat materials is interesterified. Hydrogenation may be performed according to need. The hydrogenation can be applied to any one of a raw oil-and-fat material, an oil-and-fat mixture of two or more raw oil-and-fat materials (before interesterification), and oils-and-fats after interesterification. The hydrogenated oil means a hydrogenated oil and a highly hydrogenated oil. The hydrogenation can be suitably controlled and achieved by those skilled in the art.

The oil mixture of two or more raw oil-and-fat materials is not particularly limited, and specific examples thereof include an oil mixture of a laurine-based oil-and-fat (or its hydrogenated oil) and a vegetable oil-and-fat rich in a fatty acid having 16 to 18 carbon atoms (or its hydrogenated oil). Examples of the vegetable oil-and-fat rich in a fatty acid having 16 to 18 carbon atoms include rapeseed oil, soybean oil, and palm oil. Specific examples include an oil-and-fat (including an oil mixture of b1 and b2) containing a laurine-based oil-and-fat or its hydrogenated oil (b1) and a palm-based oil-and-fat or its hydrogenated oil (b2).

The laurine-based oil-and-fat (b1) is an oil-and-fat containing 30 mass % or more of lauric acid in its constituent fatty acids. Specific examples thereof include palm oil, palm kernel oil, and their fractionated oils. These may be used alone or in arbitrary combination of two or more. Lauric acid is a saturated fatty acid having 12 carbon atoms (C12:0) and is also called dodecanoic acid.

As the palm-based oil-and-fat (b2), any palm oil or any fractionated oil of palm oil can be used without limitation. Specific examples thereof include (1) palm olein and palm stearin, which are one-stage fractionated oils, (2) palm olein (palm super olein) and a palm mid fraction, which are fractionated oils (two-stage fractionated oils) of palm olein, and (3) palm olein (soft palm) and palm stearin (hard stearin), which are fractionated oils (two-stage fractionated oils) of palm stearin.

The process of fractionating palm oil is not particularly limited, and any process of solvent fractionation, dry fractionation, and emulsification fractionation may be employed. The palm-based oil-and-fat is preferably used after being highly hydrogenated. However, palm stearin containing saturated fatty acid having 16 to 18 carbon atoms in a high content may be used without being highly hydrogenated.

The raw oil-and-fat material of the interesterified oil (B) may contain another oil-and-fat and fatty acid, in addition to the above-mentioned oils-and-fats and fatty acids, as long as the constituent fatty acids are in the above-mentioned range.

A preferred form of the interesterified oil (B) contained in the oil-and-fat composition for coating of the present invention is, for example, one obtained by interesterifying a mixture of palm kernel oil or its fractionated oil (corresponding to the b1) and a palm-based oil-and-fat (corresponding to the b2) at a ratio of 30:70 to 70:30 and then hydrogenating the interesterified mixture until that the iodine value becomes 10 or less. In this case, the palm kernel oil or its fractionated oil and the palm-based oil-and-fat may be first separately hydrogenated and be mixed within the mixing ratio range of 30:70 to 70:30 so that the iodine value is 10 or less, and lastly interesterification may be conducted. That is, in the production of the interesterified oil (B), either the interesterification or the hydrogenation may be performed first. The iodine value of the interesterified oil (B) is preferably 10 or less, further preferably 5 or less, and most preferably 2 or less for sufficiently reducing the content of trans-fatty acids. The hydrogenation may be performed by any method without particular limitation. For example, it can be performed in the presence of a nickel catalyst under conditions of a hydrogen pressure of 0.02 to 0.3 Mpa and a temperature of 160 to 200° C.

Another example is an interesterified oil-and-fat of a mixture of highly hydrogenated palm kernel oil and highly hydrogenated palm oil at a ratio of 50:50.

Another preferred form of the interesterified oil (B) is, for example, an oil-and-fat obtained by interesterifying a laurine-based oil-and-fat having an iodine value of 10 or less (corresponding to the b1) and a palm-based oil-and-fat having an iodine value of 20 or less (corresponding to the b2). Examples of the laurine-based oil-and-fat having an iodine value of 10 or less include a stearin fraction of palm kernel oil. The iodine value of the stearin fraction of the palm kernel oil is preferably 10 or less, further preferably 7 or less. Examples of the palm-based oil-and-fat having an iodine value of 20 or less include a stearin fraction of palm oil. The stearin fraction of the palm oil is preferably a two-stage stearin fraction (hard stearin) obtained by further fractionating palm stearin, which is a one-stage fractionation of palm oil, and the iodine value thereof is preferably 20 or less, further preferably 16 or less, and most preferably 14 or less. A preferred interesterified oil (B) is, for example, one obtained by interesterifying a mixture of palm kernel oil stearin fraction having an iodine value of 10 or less and palm stearin having an iodine value of 20 or less that are mixed so as to have an iodine value of 17 or less at a mixture ratio of 30:70 to 70:30.

The oil-and-fat composition for coating of the present invention has a tri-saturated fatty acid acylglycerol content of 10 to 15 mass %, preferably, 10 to 13 mass %. The tri-saturated fatty acid acylglycerol is one where three saturated fatty acids are bound to glycerol and is preferably one where three saturated fatty acids having 16 or more carbon atoms are bound to glycerol, and is, in the present description, abbreviated to "SSS" in some cases. When the tri-saturated fatty acid acylglycerol content is within the above-mentioned range, the effects of the present invention are suitably exhibited. When the content is smaller than the range, there is a tendency that drying and sticky properties are deteriorated. On the other hand, when the content is larger than the range, cracking and melt-in-the-mouth properties tend to be deteriorated.

The SSS content in the interesterified oil (A) and the SSS content in the interesterified oil (B) are not particularly limited. In the oil-and-fat composition for coating of the present invention, it is preferable that the content of the interesterified oil (A) is larger than that of the interesterified oil (B). Therefore, it is preferable that the SSS content in the interesterified oil (B) is larger than that in the interesterified oil (A). Specifically, for example, the SSS content of the interesterified oil (A) is less than 13 mass %, and the SSS content of the interesterified oil (B) is higher than 15%. The SSS content in the interesterified oil (B) may be, for example, 20 mass % or more, 25 mass % or more, or 30 mass % or more.

Another form of the present invention is "a process of producing an oil-and-fat composition by preparing interesterified oils having different SSS contents and adjusting the content of the tri-saturated fatty acid acylglycerol to 10 to 15 mass %". As the "interesterified oils having different SSS contents", those in the above-mentioned relationship are used.

The oil-and-fat composition for coating of the present invention may further contain an oil-and-fat having a tri-saturated fatty acid acylglycerol content of 90 mass % or more. The oil-and-fat having a tri-saturated fatty acid acylglycerol content of 90 mass % or more is not particularly limited and is, for example, a highly hydrogenated oil of a vegetable oil-and-fat. Further specific examples include highly hydrogenated high erucic acid rapeseed oil, highly hydrogenated soybean oil, highly hydrogenated rapeseed oil, and highly hydrogenated palm oil. The highly hydrogenated high erucic acid rapeseed oil can be suitably prepared by those skilled in the art, but may be one on the market. The iodine value is not particularly limited, but in highly hydrogenated oils, the value is preferably 10 or less and is further preferably 2 or less. The SSS content is preferably 95% or more. Furthermore, the content of the oil-and-fat containing the tri-saturated fatty acid acylglycerol in a content of 90% or more is not particularly limited in the range that the SSS content in the oil-and-fat composition is in the above-mentioned range and that the effects of the present invention are not impaired, and the content is usually 0.1% or more and less than 5%, preferably, 0.1 to 3 mass %.

The oil-and-fat composition for coating of the present invention may further contain a liquid oil. The definition of the liquid oil and specific examples thereof are as previously described. The content of the liquid oil is not particularly limited, but is preferably 40 mass % or less, further preferably 30 mass % or less, relative to the total mass of the oil-and-fat composition for coating. By controlling the content of the liquid oil to the above-mentioned range, the effects of the present invention are suitably exhibited. If the content is higher than the range, sticky feeling may remain.

In the oil-and-fat composition for coating of the present invention, the total content of the interesterified oil (A) and the interesterified oil (B) is preferably 80 mass % or more, further preferably 90 to 100 mass %, and most preferably 95 to 100 mass % in the total oil-and-fat composition. As long as the total content of the interesterified oil (A) and the interesterified oil (B) is within this range, the effects of the present invention are suitably exhibited.

Furthermore, when the oil-and-fat composition for coating of the present invention contains the liquid oil, the total content of the interesterified oil (A), the interesterified oil (B), and the liquid oil in the total oil-and-fat composition is preferably 80 mass % or more, further preferably 90 to 100 mass %, and most preferably 95 to 100 mass %. As long as the total content of the interesterified oil (A), the interesterified oil (B), and the liquid oil is within this range, the effects of the present invention are suitably exhibited.

The oil-and-fat composition for coating of the present invention may contain an additional oil-and-fat within a range that does not impair the effects of the present invention.

The oil-and-fat composition for coating of the present invention can contain an additive within a range that does not impair the effects of the present invention. Examples of the additive include an emulsifier that is usually used in oily food (for example, chocolate).

The contents of the additional oil-and-fat and the additive are not particularly limited. Usually, the total content thereof is less than 20 mass %, preferably less than 10 mass %, and particularly preferably less than 5 mass % relative to the total mass of the oil-and-fat composition.

The constituent fatty acids of the oil-and-fat composition for coating of the present invention can be analyzed by a method known to those skilled in the art. For example, analysis in accordance with AOCS Celf-96 is possible.

Furthermore, the content of the tri-saturated fatty acid acylglycerol in the oil-and-fat composition for coating of the present invention can be determined by, for example, gas chromatography. The details are as in Examples described below.

Next, the interesterification (nonselective interesterification) used in the production of the interesterified oil (A) and the interesterified oil (B) contained in the oil-and-fat composition for coating of the present invention will be described. The nonselective interesterification can be performed by a common method, and the conditions can be suitably adjusted by those skilled in the art. The method of the interesterification is not particularly limited, and chemical interesterification using a synthetic catalyst or enzymatic interesterification using lipase as a catalyst can be used.

In the chemical interesterification, the interesterification is performed using a chemical catalyst such as sodium methoxide as a catalyst. In the chemical interesterification, the positional specificity of the interesterification is low. (it is also referred to as nonselective interesterification or random interesterification).

For example, the chemical interesterification can be performed, according to a common procedure, by sufficiently drying a raw oil-and-fat material, adding a catalyst in an amount of 0.1 to 1 mass % relative to the mass of the raw oil-and-fat material, and stirring them for the reaction at 80 to 120° C. for 0.5 to 1 hours under reduced pressure. After the completion of the interesterification, the catalyst is removed by washing with water, and then the resulting product can be subjected to decoloration and deodorization, which are performed in purification of common edible oil.

In the enzymatic interesterification, the interesterification is performed using lipase as a catalyst. The lipase can be used in a form of powder or as immobilized lipase where lipase powder is immobilized on a carrier such as Celite or an ion exchange resin. Examples of the lipase that can achieve interesterification low in positional specificity include lipase derived from *Alcaligenes* sp. (for example, Lipase QLM and Lipase PL, products of Meito Sangyo Co., Ltd.) and lipase derived from *Candida* yeast (for example, Lipase OF, a product of Meito Sangyo Co., Ltd.).

For example, the enzymatic interesterification can be performed by adding lipase powder or immobilized lipase in an amount of 0.02 to 10 mass %, preferably 0.04 to 5 mass %, relative to the mass of the raw oil-and-fat material, and stirring them for the reaction at 40 to 80° C., preferably 40 to 70° C., for 0.5 to 48 hours, preferably 0.5 to 24 hours. After the completion of the interesterification, the lipase powder or the immobilized lipase is removed by, for example, filtration, and then the resulting product can be subjected to decoloration and deodorization, which are performed in purification of common edible oil.

Next, oily food for coating of the present invention will be described.

The oily food for coating of the present invention contains the above-described oil-and-fat composition for coating of the present invention.

The oily food for coating of the present invention contains the oil-and-fat composition for coating of the present invention in an amount of preferably 50 mass % or more, further preferably 60 mass % or more, and further preferably 70 mass % or more, relative to the total mass of the oil-and-fat composition constituting the oily food for coating. Specifically, the oil-and-fat composition for coating is contained in an amount of 70 to 100 mass %. When the oily food for coating is chocolate, since many of commercially available chocolate usually contains fat in an amount of 30 to 50 mass % relative to the total mass of the chocolate, the oil-and-fat composition for coating of the present invention is usually contained in an amount of 15 to 50 mass % relative to the total mass of the chocolate.

In the oily food for coating, chocolate and its similar substance (oiled food) are included.

The chocolate in the present invention is not limited to those defined in the rule (the fair competition for proper labeling of chocolate products) or legal regulation and refers to chocolate products containing ingredients derived from cacao beans. Furthermore, in these chocolate products, chocolate and quasi-chocolate defined in the fair competition for proper labeling of chocolate products (The Japan Fair Trade Council of Chocolate products) are included. The chocolate in the present invention may be dark chocolate, white chocolate, or color chocolate where a desired color is applied to a white chocolate base.

The coating chocolate can be produced by a common method. Specifically, it can be produced by rolling and conching of common ingredients (for example, cacao mass, sugar, cacao butter, and cacao butter equivalent) contained in chocolate.

The oiled food in the present invention is food that does not contain ingredients derived from cacao beans, but has properties similar to the above-mentioned chocolate products. Therefore, it is handled as in chocolate products by general consumers. Examples of the oiled food include those containing sugar, an oil-and-fat (for example, cacao butter equivalent), lactose, whole milk powder, and lecithin and having properties similar to those of chocolate products. The oiled food can be produced by a common method, specifically, by a method similar to that in the coating chocolate.

The oily food for coating of the present invention can coat various types of food, for example, sweets (baked confectioneries) and bread. That is, the present invention provides food coated with the oily food for coating of the present invention. In particular, the oily food for coating can be also applied to soft products such as Danish pastry, sponge cake, and éclair.

The method of coating the oily food for coating of the present invention to food will be described using chocolate as an example. Oiled food other than chocolate can be used for coating by a similar method.

The above-mentioned coating chocolate is heated to a predetermined temperature and is stirred thoroughly to a uniform state (see Examples below as specific examples).

Then, food such as sweets coated with chocolate is obtained by dropping the chocolate to a desired portion of the food from above or dipping the food thoroughly or partially in the coating chocolate and then pulling it up. The coating chocolate provided by the present invention dries in a short time even at ambient temperature, but may be artificially cooled (in a refrigerator or with cool wind) according to need.

Alternatively, as another method, for example, food coated with chocolate can be produced by conveying food on a conveyer and dropping heated liquid chocolate to the food from above (enrober).

EXAMPLES

The present invention will be described in further detail with reference to Examples below, but it is to be understood that the scope of the present invention is not limited thereto. Incidentally, in the following Examples, "part(s)" and "%" represent "part(s) by mass" and "mass %", respectively, unless otherwise specified.

In the following Examples, the palm olein (iodide value: 56) was "Palm Olein", a product of Nisshin OiliO Group, Ltd.; the highly hydrogenated palm kernel oil was an in-house product of Nisshin OiliO Group, Ltd.; the rapeseed oil was "Nisshin Canola", a product of Nisshin OiliO Group, Ltd.; the palm oil was "Purified Palm Oil", a product of Nisshin OiliO Group, Ltd.; the cottonseed oil stearin fraction was an in-house product (iodine value: 96, wintering conditions: 5° C., 35 hours) of Nisshin OiliO Group, Ltd.; the palm kernel olein was an in-house product of Nisshin OiliO Group, Ltd.; the highly hydrogenated palm oil was "Highly Hydrogenated Palm Oil", a product of Yokozeki Oil & Fat Industries Co., Ltd.; the highly hydrogenated high erucic acid rapeseed oil was "Highly Hydrogenated High Erucic Acid Rapeseed Oil", a product of Yokozeki Oil & Fat Industries Co., Ltd.; and the palm stearin (iodine value: 32) was an in-house product of Nisshin OiliO Group, Ltd.

In the production of chocolate, the sugar was "Powder Sugar", a product of Tokukura Corporation; the cocoa powder was "Cocoa Powder JA", a product of Daitocacao Co., Ltd.; the whole milk powder was "Whole Milk Powder", a product of Takanashi Milk Products Co., Ltd.; the lactose was "Lactose", a product of Leprino Foods Company; the cocoa butter was "Cocoa Butter", a product of Daitocacao Co., Ltd.; and the lecithin was "Lecithin DX", a product of Nisshin OiliO Group, Ltd.

Process of Producing Interesterified Oil

Production Example 1

Process of Producing Interesterified Oil (A-1)

Sodium methoxide serving as a catalyst was added to 1.6 kg of palm olein (iodine value: 56) under stirring at 80° C. in an amount of 0.1 mass % relative to the palm olein. The mixture was further stirred for 30 minutes at 80° C. for interesterification.

After the completion of the interesterification, the catalyst was removed by washing with water. The resulting oil-and-fat was purified by decoloration and deodorization according to common methods to obtain an interesterified oil (A-1).

Production Example 2

Process of Producing Interesterified Oil (A-2)

Sixty-five parts of palm stearin (iodine value: 32) and 35 parts of rapeseed oil were mixed and stirred while raising the temperature to 80° C. to give 1.6 kg of a uniform oil mixture. Sodium methoxide serving as a catalyst was added to this oil mixture under stirring at 80° C. in an amount of 0.1 mass % relative to the oil mixture. The resulting mixture was further stirred for 30 minutes at 80° C. for interesterification.

After the completion of the interesterification, the catalyst was removed by washing with water. The resulting oil-and-fat was purified by decoloration and deodorization according to common methods to obtain an interesterified oil (A-2).

Production Example 3

Process of Producing Interesterified Oil (A-3)

Eighty-five parts of rapeseed oil stearin fraction (iodine value: 96) and 15 parts of highly hydrogenated palm oil were mixed and stirred while raising the temperature to 80° C. to give 1.6 kg of a uniform oil mixture. Sodium methoxide serving as a catalyst was added to this oil mixture under stirring at 80° C. in an amount of 0.1 mass % relative to the oil mixture. The resulting mixture was further stirred for 30 minutes at 80° C. for interesterification.

After the completion of the interesterification, the catalyst was removed by washing with water. The resulting oil-and-fat was purified by decoloration and deodorization according to common methods to obtain an interesterified oil (A-3).

Production Example 4

Process of Producing Interesterified Oil (B)

Fifty parts of highly hydrogenated palm kernel oil and 50 parts of highly hydrogenated palm oil were mixed and stirred while raising the temperature to 80° C. to give 1.6 kg of a uniform oil mixture. Sodium methoxide serving as a catalyst was added to this oil mixture under stirring at 80° C. in an amount of 0.1 mass % relative to the oil mixture. The resulting mixture was further stirred for 30 minutes at 80° C. for interesterification.

After the completion of the interesterification, the catalyst was removed by washing with water. The resulting oil-and-fat was purified by decoloration and deodorization according to common methods to obtain an interesterified oil (B).

The interesterified oil (B) had an iodine value of 0.7.

Production Comparative Example 1

Process of Producing Interesterified Oil (C)

Thirty parts of palm oil, 35 parts of palm stearin (iodine value: 32), and 35 parts of palm kernel olein were mixed and stirred while raising the temperature to 60° C. to give 1.6 kg of a uniform oil mixture. Lipase powder derived from *Alcaligenes* sp. (Lipase PL: a product of Meito Sangyo Co., Ltd.) was added to this oil mixture in an amount of 0.1 mass % relative to the oil mixture. The resulting mixture was further stirred for 16 hours at 60° C. for interesterification.

After the completion of the interesterification, the lipase was removed by filtration. The resulting oil-and-fat was purified by decoloration and deodorization according to common methods to obtain an interesterified oil (C).

In the present Examples, the oil-and-fat compositions for coating were evaluated by the following methods.

(1) Measurement of Fatty Acid Composition And SSS-Type Triacyl Glycerol (TAG) Content The interesterified oils (A-1) to (A-3), (B), and (C) and highly hydrogenated high erucic acid oil were measured for fatty acid compositions and SSS-type TAG contents by the following methods. The results are shown in Table 1. In Table 1, "−" means that the value was below the detection limit.

(2) Method of Measuring Fatty Acid Composition

Fatty acid composition was measured in accordance with the Standard Methods for the Analysis of Fats, Oils and Related Materials (2.4.1.1, 2-1996, 2.4.2.1, 2-1996) with capillary gas chromatography (Model HP6890 gas chromatography: a product of Hewlett-Packard Japan, Ltd.).

(3) SSS-Type Triacyl Glycerol (TAG) Content

Since the interesterified oils (A-1) to (A-3) and (B) were obtained by nonselective interesterification using a chemical catalyst, their SSS-type TAG contents were calculated based on the fatty acid compositions.

Since the content of the saturated fatty acid having 16 or more carbon atoms in the highly hydrogenated high erucic acid rapeseed oil is 99.6%, it is supposed that almost the entire of the highly hydrogenated high erucic acid rapeseed oil is SSS-type TAG. Here, the SSS-type TAG content of the highly hydrogenated high erucic acid rapeseed oil was assumed to be 99.5%.

The triacyl glycerol (TAG) composition of the interesterified oil (C) was analyzed with GLC (Model GC-2010: a product of Shimadzu Corporation), and then the SSS-type TAG content was calculated. The conditions for the GLC analysis were as follows:

Column: Rtx-65TG (a product of Restek Corporation), 15 m×0.1 μm×0.25 mm

Detector: FID
Carrier gas: He
Split ratio: 60:1
Column temperature: from 350° C. (1 min) to 365° C. (4 min) at a heating rate of 1° C./min
Inlet temperature: 365° C.
Detector temperature: 365° C.

TABLE 1

|  | Interesterified oil A-1 | Interesterified oil A-2 | Interesterified oil A-3 | Interesterified oil B | Interesterified oil C | Rapeseed oil | Highly hydrogenated high erucic acid rapeseed oil |
|---|---|---|---|---|---|---|---|
| Each fatty acid content (%) of constituent fatty acids in oil-and-fat | | | | | | | |
| C8:0 | — | — | — | 2.2 | 1.2 | — | — |
| C10:0 | — | — | — | 1.8 | 1.1 | — | — |
| C12:0 | 0.2 | 0.1 | — | 19.4 | 14.8 | — | — |
| C14:0 | 1.0 | 0.8 | 0.8 | 6.7 | 5.6 | — | 0.1 |
| C16:0 | 39.8 | 42.3 | 38.1 | 34.5 | 36.4 | 4.3 | 3.8 |
| C18:0 | 4.4 | 3.8 | 10.2 | 34.9 | 4.1 | 1.9 | 37.9 |
| C18:1 | 42.7 | 37.5 | 13.7 | — | 29.9 | 60.8 | 0.2 |
| C18:2 | 10.8 | 10.7 | 36.3 | — | 6.6 | 20.3 | — |
| C18:3 | 0.2 | 3.6 | 0.3 | — | — | 10.1 | — |
| C20:0 | 0.4 | 0.4 | 0.2 | 0.2 | 0.3 | 0.6 | 8.0 |
| C20:1 | — | 0.4 | — | — | — | 1.2 | — |
| C22:0 | — | 0.1 | — | — | — | 0.3 | 48.5 |
| C24:0 | — | — | — | — | — | 0.1 | 1.4 |
| Fatty acid with C16 or more in constituent fatty acid (%) | 98.4 | 98.7 | 98.8 | 69.8 | 77.0 | 99.6 | 99.7 |
| Saturated fatty acid with C16 or more in constituent fatty acid (%) | 44.6 | 46.6 | 48.5 | 69.6 | 40.8 | 7.1 | 99.6 |
| SSS-type TAG content (%) | 8.9 | 10.1 | 11.4 | 33.7 | 4.0 | 0 | 99.5 |
| Oleic acid & linoleic acid content (%) | 53.5 | 48.2 | 50.0 | — | 36.5 | 81.1 | 0.2 |

Example 1

Preparation of Oil-And-Fat Composition

Oil-and-fat compositions 1 to 13 were prepared by stirring mixtures having compositions shown in Tables 2 and 3 under heating according to need. The unit of the figures in Tables 2 and 3 is mass %.

TABLE 2

|  | Oil-and-fat composition 1 | Oil-and-fat composition 2 | Oil-and-fat composition 3 | Oil-and-fat composition 4 | Oil-and-fat composition 5 | Oil-and-fat composition 6 |
|---|---|---|---|---|---|---|
| Interesterified oil A-1 | 95 | 90 | 94 | 89 | 85 | 80 |
| Interesterified oil B | 5 | 10 | 5 | 10 | 15 | 20 |
| Highly hydrogenated high erucic acid rapeseed oil | — | — | 1 | 1 | — | — |
| SSS content (%) | 10.1 | 11.4 | 11.0 | 12.3 | 12.6 | 13.8 |
| Total content of interesterified oils A-1 and B (%) | 100 | 100 | 99 | 99 | 100 | 100 |

TABLE 3

|  | Oil-and-fat composition 7 | Oil-and-fat composition 8 | Oil-and-fat composition 9 | Oil-and-fat composition 10 | Oil-and-fat composition 11 | Oil-and-fat composition 12 | Oil-and-fat composition 13 |
|---|---|---|---|---|---|---|---|
| Interesterified oil A-1 | — | — | 70 | 60 | — | 99 | 85 |
| Interesterified oil A-2 | 95 | — | — | — | — | — | — |
| Interesterified oil A-3 | — | 90 | — | — | — | — | — |
| Interesterified oil B | 5 | 10 | 10 | 10 | 10 | — | 10 |
| Interesterified oil C | — | — | — | — | 88 | — | — |
| Rapeseed oil | — | — | 20 | 30 | — | — | — |
| Highly hydrogenated high erucic acid rapeseed oil | — | — | — | — | 2 | 1 | 5 |
| SSS content (%) | 10.3 | 13.7 | 12.1 | 10.3 | 8.9 | 9.8 | 15.9 |
| Total content of interesterified oils A and B (%) | 100 | 100 | — | — | 10 | 99 | 95 |
| Total content of interesterified oils A and B and liquid oil (%) | — | — | 100 | 100 | — | — | — |

Example 2

Production of Coating Chocolate

One kilogram of coating chocolate was produced using each of the oil-and-fat compositions 1 to 13 according to the blending ratios shown in Table 4 (test examples 1 to 13). The production was performed by a common method for producing chocolate involving rolling and conching.

TABLE 4

| Sugar | 39.5% |
|---|---|
| Oil-and-fat composition 1 to 13 | 34.5% |
| Lactose | 12.7% |
| Whole milk powder | 10.0% |
| Cocoa butter | 3.0% |
| Lecithin | 0.3% |

The coating chocolate was evaluated by the following four tests (drying property, cracking property, sticky property, and melt-in-the-mouth property). The evaluation results are shown in Tables 5 and 6.

(1) Evaluation of Drying Property

The drying property was evaluated by drying speed at ambient temperature. The specific method is shown below.

Coating chocolate was melted at 55° C. and then preliminarily cooled to 40° C. Then, one side of yeast doughnut adjusted to 25° C. in advance was dipped in the coating chocolate adjusted to 40° C. Then, the yeast doughnut was lifted up for removing excess coating chocolate and then left to stand at 23° C. Then, the surface of the coating was touched with a finger, and the time until the chocolate dried not to adhere to the finger over the entire surface was determined. The drying property was evaluated according to the following criteria:

⊙: took 10 minutes or less until the chocolate did not adhere to the finger over the entire surface, ○: took longer than 10 minutes but not longer than 15 minutes until the chocolate did not adhere to the finger over the entire surface, and X: took longer than 15 minutes until the chocolate did not adhere to the finger over the entire surface.

(2) Evaluation of Cracking Property

The cracking property was evaluated by the degree of cracking and the extent of peeling when a stress was applied to a dried oil-and-fat composition for coating. The specific method is shown below.

Yeast doughnut coated with chocolate was prepared as in the evaluation of drying property. After being left to stand at 23° C. for solidifying the chocolate, the doughnut was left to stand at 20° C. for 24 hours for stabilizing the crystals of the chocolate. Then, the degree of cracking caused in the coating when it was pressed hard with a finger was visually evaluated according to the following criteria:

⊙: cracks occurred, but peeling-off from the doughnut was little,

○: multiple cracks occurred, but peeling-off from the doughnut was relatively low, and X: multiple fine cracks occurred, and the degree of peeling-off from the doughnut was high.

(3) Evaluation of Sticky Property

Yeast doughnut coated with chocolate was prepared as in the evaluation of drying property. After being left to stand at 23° C. for solidifying the chocolate, the doughnut was left to stand at 20° C. for 24 hours for stabilizing the crystals of the chocolate. Then, the stickiness when it was touched with a finger was visually evaluated according to the following criteria:

⊙: the surface of the chocolate was not sticky, and no chocolate adhered to the finger, ○: the surface of the chocolate was slightly sticky, but no chocolate adhered to the finger, and X: the surface of the chocolate was sticky, and chocolate adhered to the finger.

(4) Melt-In-The-Mouth Property

After the evaluation of cracking property in the above (2), the melt-in-the-mouth property was sensorily evaluated by eating only the coated chocolate and was evaluated according to the following criteria:

⊙: good melt-in-the-mouth and no aftertaste,

○: good melt-in-the-mouth and slight aftertaste, and

X: bad melt-in-the-mouth and considerable aftertaste.

TABLE 5

| Used oil-and-fat composition | Test Example 1 Oil-and-fat composition 1 | Test Example 2 Oil-and-fat composition 2 | Test Example 3 Oil-and-fat composition 3 | Test Example 4 Oil-and-fat composition 4 | Test Example 5 Oil-and-fat composition 5 | Test Example 6 Oil-and-fat composition 6 |
|---|---|---|---|---|---|---|
| Drying property | ○ | ○ | ○ | ○ | ◎ | ◎ |
| Cracking property | ◎ | ○ | ◎ | ○ | ○ | ○ |
| Sticky property | ○ | ○ | ○ | ○ | ◎ | ◎ |
| Melt-in-the-mouth property | ◎ | ○ | ◎ | ○ | ○ | ○ |

TABLE 6

| Used oil-and-fat composition | Test Example 7 Oil-and-fat comp. 7 | Test Example 8 Oil-and-fat comp. 8 | Test Example 9 Oil-and-fat comp. 9 | Test Example 10 Oil-and-fat comp. 10 | Test Example 11 Oil-and-fat comp. 11 | Test Example 12 Oil-and-fat comp. 12 | Test Example 13 Oil-and-fat comp. 13 |
|---|---|---|---|---|---|---|---|
| Drying property | ○ | ○ | ○ | ○ | X | X | ◎ |
| Cracking property | ◎ | ◎ | ◎ | ◎ | ◎ | ◎ | X |
| Sticky property | ○ | ○ | ○ | ○ | X | X | ◎ |
| Melt-in-the-mouth property | ◎ | ○ | ◎ | ◎ | ◎ | ◎ | X |

As shown in Tables 5 and 6, the test examples 1 to 8 where the oil-and-fat compositions 1 to 8 were used were satisfactory in drying property, cracking property, sticky property, and melt-in-the-mouth property.

On the other hand, the test example 11 where the oil-and-fat composition 11 containing the interesterified oil (C) instead of the interesterified oil (A) was inferior to the test examples 1 to 8 in drying property and sticky property. Similarly, the test example 12 where the oil-and-fat composition 12 not containing the interesterified oil (B) was used was inferior to the test examples 1 to 8 in drying property and sticky property. Furthermore, the test example 13 where the oil-and-fat composition 13 having a relatively high SSS content was used was inferior to the test examples 1 to 8 in cracking property and melt-in-the-mouth property.

From the results of the test examples 1 to 8, 11, and 12, it was confirmed that combination of the interesterified oils (A) and (B) and controlling of the SSS content to a certain range makes it possible to obtain coating chocolate that dries quickly at room temperature, hardly cracks when it is applied with a stress, is not sticky thereby not to adhere to wrapping materials, and satisfactorily melts in the mouth.

Incidentally, the test examples 9 and 10 containing a liquid oil showed effects similar to those of the test examples 1 to 8.

Example 3

Chocolate that is a different type from that in Example 2 was evaluated using the oil-and-fat composition 2.

One kilogram of coating chocolate with milk flavor was produced using the oil-and-fat composition 2 according to the blending ratios shown in Table 7 (test example 14). The production was performed by a common method for producing chocolate involving rolling and conching.

TABLE 7

| | |
|---|---|
| Sugar | 41.9% |
| Oil-and-fat composition 2 | 37.8% |
| Cocoa powder | 15.0% |
| Whole milk powder | 5.0% |
| Lecithin | 0.3% |

The resulting coating chocolate was evaluated as in Example 1. The results are shown in Table 8.

TABLE 8

| | Test Example 14 |
|---|---|
| Used oil-and-fat composition | Oil-and-fat composition 2 |
| Drying property | ◎ |
| Cracking property | ○ |
| Sticky property | ◎ |
| Melt-in-the-mouth property | ○ |

As shown in Table 8, the test example 14 (chocolate with milk flavor) was satisfactory in drying property, cracking property, sticky property, and melt-in-the-mouth property, as in Example 1 (white chocolate).

The invention claimed is:
1. An oil-and-fat composition for coating, comprising:
an interesterified oil (A) that is nonselectively interesterified and contains 80 mass % or more of a fatty acid having 16 or more carbon atoms and 35 to 60 mass % of a saturated fatty acid having 16 or more carbon atoms in its constituent fatty acids; and
an interesterified oil (B) that is nonselectively interesterified and contains 20 to 60 mass % of a saturated fatty acid having 12 to 14 carbon atoms and 40 to 80 mass % of a saturated fatty acid having 16 to 18 carbon atoms in its constituent fatty acids, and the composition includes a tri-saturated fatty acid acylglycerol in a content of 10 to 15 mass %.

2. The oil-and-fat composition for coating according to claim 1, wherein the total content of the oleic acid and the linoleic acid of the constituent fatty acids of the interesterified oil (A) is 40 mass % or more of the total mass of the constituent fatty acids of the interesterified oil (A).

3. The oil-and-fat composition for coating according to claim 2, wherein a raw oil-and-fat material of the interesterified oil (B) includes a laurine-based oil-and-fat or its hydrogenated oil (bl) and a palm-based oil-and-fat or its hydrogenated oil (b2).

4. The oil-and-fat composition for coating according to claim 3, wherein the interesterified oil (B) has an iodine value of 20 or less.

5. The oil-and-fat composition for coating according to claim 3, the composition further comprising an oil-and-fat having a tri-saturated fatty acid acylglycerol content of 90 mass % or more.

6. The oil-and-fat composition for coating according to claim 2, wherein the interesterified oil (B) has an iodine value of 20 or less.

7. The oil-and-fat composition for coating according to claim 2, the composition further comprising an oil-and-fat having a tri-saturated fatty acid acylglycerol content of 90 mass % or more.

8. The oil-and-fat composition for coating according to claim 1, wherein a raw oil-and-fat material of the interesterified oil (B) includes a laurine-based oil-and-fat or its hydrogenated oil (bl) and a palm-based oil-and-fat or its hydrogenated oil (b2).

9. The oil-and-fat composition for coating according to claim 8, wherein the interesterified oil (B) has an iodine value of 20 or less.

10. The oil-and-fat composition for coating according to claim 8, the composition further comprising an oil-and-fat having a tri-saturated fatty acid acylglycerol content of 90 mass % or more.

11. The oil-and-fat composition for coating according to claim 1, wherein the interesterified oil (B) has an iodine value of 20 or less.

12. The oil-and-fat composition for coating according to claim 11, the composition further comprising an oil-and-fat having a tri-saturated fatty acid acylglycerol content of 90 mass % or more.

13. The oil-and-fat composition for coating according to claim 1, the composition further comprising an oil-and-fat having a tri-saturated fatty acid acylglycerol content of 90 mass % or more.

14. The oil-and-fat composition for coating according to claim 1, the composition further comprising a liquid oil.

15. The oil-and-fat composition for coating according to claim 14, wherein the total content of the interesterified oil (A), the interesterified oil (B), and the liquid oil is 80 mass % or more in the total oil-and-fat composition.

16. The oil-and-fat composition for coating according to claim 1, wherein the content of the interesterified oil (A) is larger than any other ingredients in the oil-and-fat composition.

17. The oil-and-fat composition for coating according to claim 1, wherein the content of the interesterified oil (B) is 20 mass % or less in the total oil-and-fat composition.

18. The oil-and-fat composition for coating according to claim 1, wherein the total content of the interesterified oil (A) and the interesterified oil (B) is 80 mass % or more in the total oil-and-fat composition.

19. An oily food for coating comprising the oil-and-fat composition for coating according to claim 1.

20. Food coated with the oily food for coating according to claim 19.

* * * * *